(12) United States Patent
Kume et al.

(10) Patent No.: US 12,248,116 B2
(45) Date of Patent: Mar. 11, 2025

(54) CHARGED-PARTICLE MEASUREMENT APPARATUS AND CONTROL METHOD OF CHARGED-PARTICLE MEASUREMENT APPARATUS

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Naoto Kume, Yokohama (JP); Haruo Miyadera, Kawasaki (JP); Takuro Fujimaki, Ota (JP); Tsukasa Sugita, Yokohama (JP); Yuki Nakai, Yokohama (JP); Masataka Suga, Kawasaki (JP); Kohei Nobe, Ota (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 385 days.

(21) Appl. No.: 17/843,043

(22) Filed: Jun. 17, 2022

(65) Prior Publication Data
US 2023/0026295 A1 Jan. 26, 2023

(30) Foreign Application Priority Data
Jul. 20, 2021 (JP) .................... 2021-119390

(51) Int. Cl.
*G01V 5/22* (2024.01)
*G01T 1/29* (2006.01)

(52) U.S. Cl.
CPC .............. *G01V 5/22* (2024.01); *G01T 1/2935* (2013.01); *G01T 1/2985* (2013.01)

(58) Field of Classification Search
CPC ....... G01V 5/22; G01T 1/2935; G01T 1/2985; H01J 47/02; H01J 47/022
See application file for complete search history.

(56) References Cited

U.S. PATENT DOCUMENTS

2016/0054458 A1* 2/2016 Blanpied ................. G01T 7/005
250/252.1
2016/0291197 A1* 10/2016 Sossong ................... G01V 5/26

FOREIGN PATENT DOCUMENTS

JP 5479904 B2 4/2014
JP 2017-146269 A 8/2017
(Continued)

OTHER PUBLICATIONS

Biebel, et al., "Test and Calibration of Large Drift Tube Chambers with Cosmic Rays", Dec. 2005, IEEE Transactions on Nuclear Science, vol. 52, No. 6, pp. 2998-3004 (Year: 2005).*

(Continued)

*Primary Examiner* — David E Smith
*Assistant Examiner* — Laura Eloise Tandy
(74) *Attorney, Agent, or Firm* — Oblon, McClelland, Maier & Neustadt, L.L.P.

(57) ABSTRACT

According to one embodiment, a charged-particle measurement apparatus comprising: a plurality of gas detectors in each of which gas for detecting passage of a charged particle is enclosed; a trajectory calculator configured to calculate a trajectory of the charged particle based on detection signals outputted from the gas detectors and each of the parameters associated with the gas detectors; a measurer configured to measure an object based on the trajectory of the charged particle, the object being a measurement target; a signal intensity acquirer configured to acquire signal intensity of the detection signals; an operating state monitor configured to evaluate the operating states of the gas detectors based on the signal intensity corresponding to the gas detectors; and (Continued)

a parameter updating processor configured to update at least one parameter when at least one of the operating states of the gas detectors associated with this parameter changes.

7 Claims, 11 Drawing Sheets

(56) References Cited

FOREIGN PATENT DOCUMENTS

| | | | |
|---|---|---|---|
| JP | 6342399 B2 | 6/2018 | |
| JP | 6465867 B2 | 2/2019 | |
| WO | WO-2020088067 A1 * | 5/2020 | ............. G01N 23/10 |

OTHER PUBLICATIONS

English translation of WO 2020088067 A1 (Year: 2020).*

* cited by examiner

CHARGED-PARTICLE MEASUREMENT APPARATUS AND CONTROL METHOD OF CHARGED-PARTICLE MEASUREMENT APPARATUS

CROSS-REFERENCE TO RELATED APPLICATION

This application is based upon and claims the benefit of priority from Japanese Patent Application No. 2021-119390, filed on Jul. 20, 2021, the entire contents of which are incorporated herein by reference.

FIELD

Embodiments of the present invention relate to charged-particle measurement techniques.

BACKGROUND

A fluoroscopic technique using charged particles such as muons is known as a technique for imaging inside of an object to be measured. Charged particles pass through a substance while scattering in the substance, and this property is different from light, X-rays, and electromagnetic waves. Thus, it is known as its feature that density or average atomic number of a substance can be estimated from the direction of charged particles arrival and the degree of its scattering.

Some charged particles are generated by cosmic rays called cosmic ray muons that come from outside the earth's atmosphere. The cosmic ray muons have very high energy and high penetrating power, and thus, are used for imaging large structures such as a volcano and a pyramid. In the case of such imaging, it is important to accurately acquire the trajectories of charged particles. As the conventional technology, there is an apparatus using a plastic scintillator or a fiber scintillator. There is also an apparatus using a drift tube detector as a gas detector.

For example, in a proposed detection method, the trajectories of charged particles in the vertical position of the object are calculated by arranging a plurality of drift tube detectors above and below the object, and radioactive substances are detected by acquiring information on the inside of the object from the calculated trajectories and acquiring a gamma ray signal.

Although use of drift tube detectors enables measurement of an object by cosmic ray muons, in order to ensure high measurement accuracy, it is important to maintain constant performance. However, due to the characteristic that drift tube detectors are filled with gas, their performance may change due to change in composition or pressure of the gas. Measurement with a heavy object placed on the drift tube detectors and/or change in temperature may cause change in shape or position of the drift tube detector. Due to these factors, the performance may vary from measurement to measurement. In particular, both of change in composition of the gas and deviation in position of the drift tube detectors are so small that direct inspection is difficult, and it is also difficult to inspect and correct the change in gas composition and the positional deviation in real time.

In view of the above-described circumstances, embodiments of the present invention aim to provide a charged-particle measurement technique that can grasp the type or degree of deterioration of the gas detectors and maintain a constant measurement accuracy for a long period of time.

DETAILED DESCRIPTION

In one embodiment of the present invention, a charged-particle measurement apparatus comprising: a plurality of gas detectors in each of which gas for detecting passage of a charged particle is enclosed; a trajectory calculator configured to calculate a trajectory of the charged particle based on detection signals outputted from the plurality of gas detectors and each of the parameters associated with the plurality of gas detectors; a measurer configured to measure an object based on the trajectory of the charged particle, the object being a measurement target; a signal intensity acquirer configured to acquire signal intensity of the detection signals; an operating state monitor configured to evaluate each of the operating states of the plurality of gas detectors based on the signal intensity corresponding to each of the plurality of gas detectors; and a parameter updating processor configured to update at least one parameter when at least one of the operating states of the plurality of gas detectors associated with this parameter changes.

According to embodiments of the present invention, it is possible to provide a charged-particle measurement technique that can grasp the type or degree of deterioration of the gas detectors and maintain the constant measurement accuracy for the long period of time.

First Embodiment

Hereinbelow, embodiments of a charged-particle measurement apparatus and its control method will be described in detail by referring to the accompanying drawings. First, a description will be given of the first embodiment by referring to FIG. 1 to FIG. 11.

Figure 1:
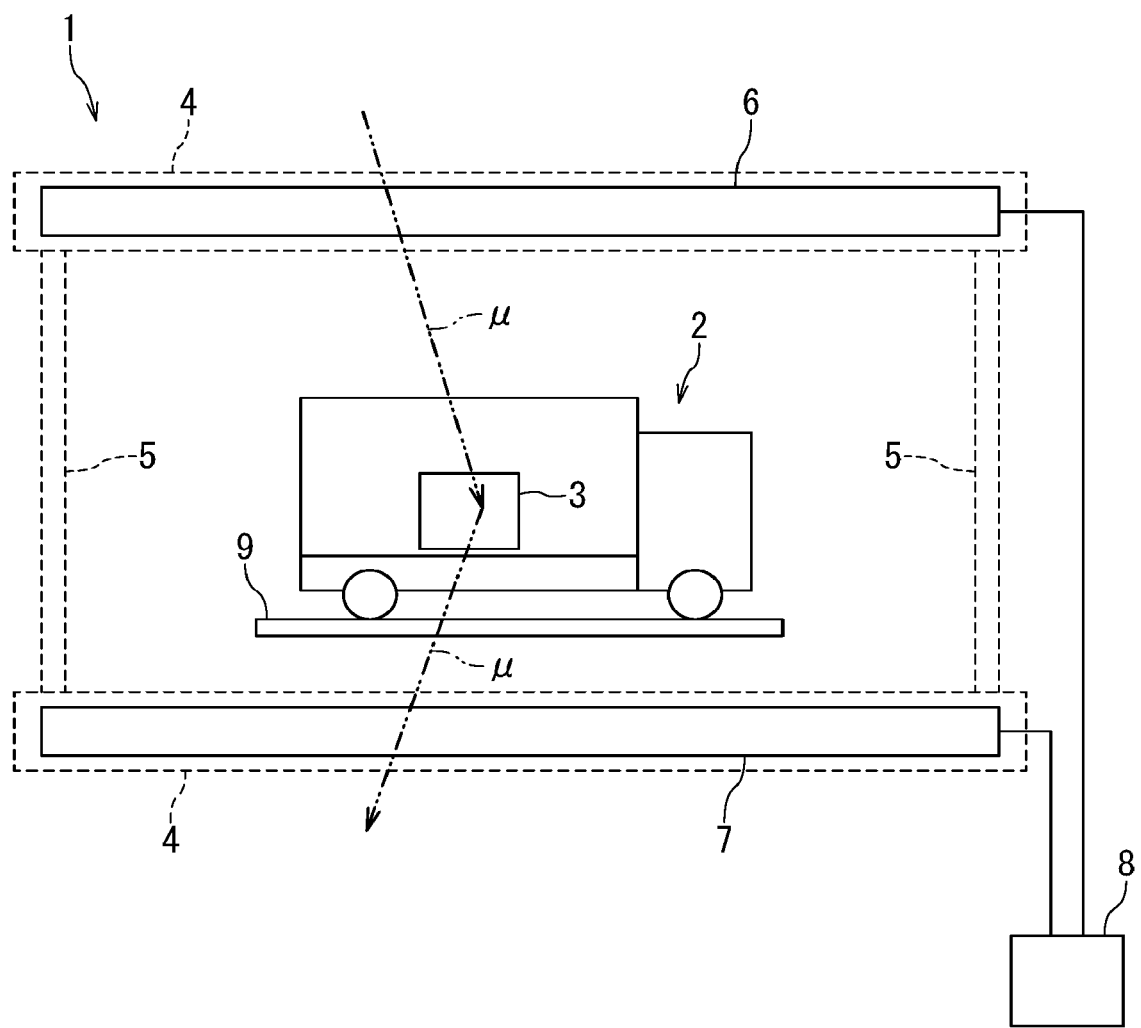
FIG. 1 is a schematic diagram illustrating a muon tomography apparatus according to the first embodiment.

The reference sign 1 in FIG. 1 denotes a muon tomography apparatus configured as a charged-particle measurement apparatus. This muon tomography apparatus 1 is a non-destructive inspection system that inspects an object to be measured without destroying this object. A vehicle 2 such as a truck that transports a container is illustrated as an object to be measured. For example, the muon tomography apparatus 1 is used to inspect whether a predetermined object 3 is present in the vehicle 2 or not. The object may be, for example, a container to be transported by aircraft or by ship and a baggage that can be carried by human power.

This muon tomography apparatus 1 inspects (i.e., images) the vehicle 2 by muon tomography (i.e., muon inspection) in which the muon μ is used as a charged particle. For example, it is checked whether the goods contained in the cargo to be transported are consistent with the contents described in the applied specification or not. Additionally or alternatively, it is checked whether an illegal substance is included or not. In particular, inspections are conducted for the purpose of detecting a nuclear material such as uranium concealed in the cargo. Since many inspections are conducted continuously, the inspections are conducted without opening the inside of the cargo.

It is sufficient if the muon tomography apparatus 1 can at least identify the type of substance. Types of substances include the elements of the substance, the composition of the substance, the proportion of each element contained in the substance, the density of the substance, and the amount of the substance. The type of substance can be identified by utilizing the feature that the scattering angle of the muon μ is different for each substance.

Muons μ to be used in muon tomography mainly exist as cosmic rays. Muons μ are a type of secondary cosmic rays to be generated by the reaction of primary cosmic rays having been made incoming on the earth from space with the atmosphere of the earth. The muon μ has a positive or negative charge and has a high energy of 3 to 4 GeV on average, so it has a very high penetrating power as compared with radioactive rays such as X-rays.

Muons μ can also be artificially generated by using an accelerator. Although an aspect of using cosmic ray muons μ is exemplified in the present embodiment, artificially generated muons μ may be used instead.

Although the charged-particle measurement apparatus 1 is exemplified by the muon tomography apparatus 1 in the present embodiment, the charged-particle measurement apparatus 1 may be configured as another aspect. For example, the present embodiment may be applied to a measurement apparatus that uses charged particles such as electrons.

The muon tomography apparatus 1 of the present embodiment includes a first muon trajectory detector 6, a second muon trajectory detector 7, and an analysis computer 8.

The first muon trajectory detector 6 and the second muon trajectory detector 7 are installed so as to face each other with the vehicle 2 interposed therebetween, for example, with the vehicle 2 interposed in the vertical direction. A pair of first and second muon trajectory detectors 6 and 7 is devices configured to detect muons μ, which are cosmic rays existing in nature.

Each of the first and second muon trajectory detectors 6 and 7 is housed in a predetermined housing (i.e., frame) 4. The first muon trajectory detector 6 on the upper side is supported by a stanchion 5. The second muon trajectory detector 7 on the lower side is buried underground. Further, the vehicle 2 is mounted on a predetermined base 9.

Next, the system configuration of the muon tomography apparatus 1 will be described by referring to the block diagrams of FIG. 2 and FIG. 3.

Figure 2:
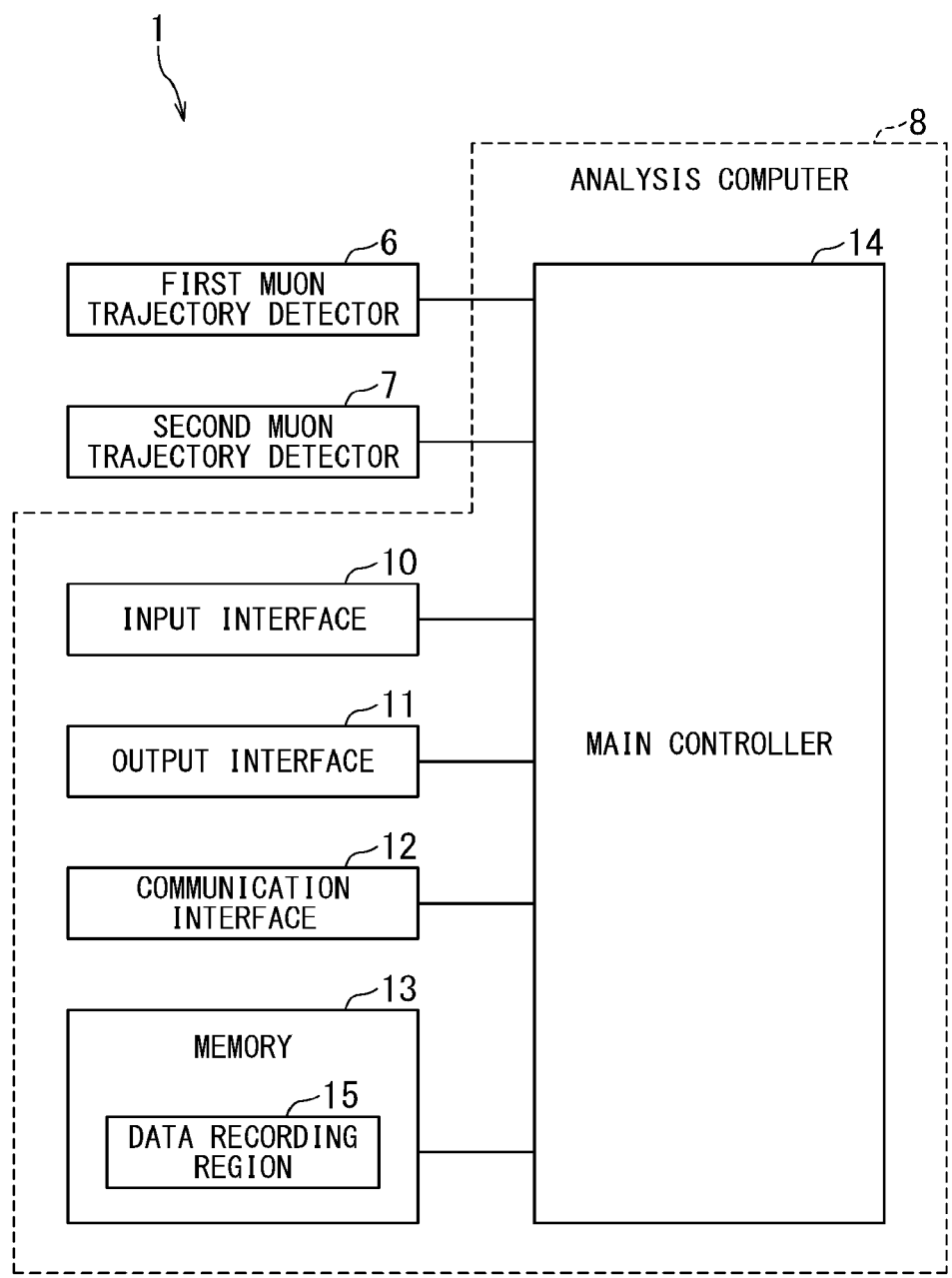
FIG. 2 is a block diagram illustrating the muon tomography apparatus according to the first embodiment.

As shown in FIG. 2, the first and second muon trajectory detectors 6 and 7 are connected to the analysis computer 8 and are controlled by the analysis computer 8.

The analysis computer 8 includes an input interface 10, an output interface 11, a communication interface 12, a memory 13, and a main controller 14. The analysis computer 8 of the present embodiment includes hardware resources such as a Central Processing Unit (CPU), a Read Only Memory (ROM), a Random Access Memory (RAM), and a Hard Disc Drive (HDD), and is configured as a computer in which information processing by software is achieved with the use of the hardware resources by causing the CPU to execute various programs. Further, the control method of charged-particle measurement apparatus of the present embodiment is achieved by causing the computer to execute the various programs.

The respective components of the analysis computer 8 do not necessarily have to be provided on one computer. For example, one analysis computer 8 may be realized by using a plurality of computers interconnected via a network. For example, a computer for controlling the first and second muon trajectory detectors 6 and 7 and another computer for inspecting the first and second muon trajectory detectors 6 and 7 may be provided separately.

The input interface 10 receives predetermined information that is inputted in response to the operation of the user of the analysis computer 8. The input interface 10 includes input devices such as a mouse and a keyboard. In other words, predetermined information is inputted to the input interface 10 depending on the operation on these input devices.

The output interface 11 outputs predetermined information. The analysis computer 8 includes a device configured to display an image, as exemplified by a display that outputs analysis results. In other words, the output interface 11 controls images to be displayed on the display. The display may be separated from the main body of the computer or may be integrated with the main body of the computer.

The analysis computer 8 may control the images to be displayed on the display of other computers interconnected via the network. In this case, the output interface 11 provided in another computer may control the output of the analysis results of the present embodiment.

Although a display is exemplified as a device for displaying images in the present embodiment, display of images may be achieved by another aspect. For example, information may be displayed by using a head-mounted display or a projector. Further, a printer configured to print out information on a paper medium may be used instead of the display. In other words, targets to be controlled by the output interface 11 may include a head-mounted display, a projector, and/or a printer.

The communication interface 12 communicates with other computers via a communication line such as the Internet. Although the analysis computer 8 and other computers are interconnected via the Internet in the present embodiment, another aspect may be applied. For example, the analysis computer 8 and other computers may be interconnected via a LAN (Local Area Network), a WAN (Wide Area Network), or a mobile communication network.

The memory 13 stores various information items necessary for performing muon inspection. For example, the memory 13 includes a database that stores the statistical values of the scattering angle of muon scattering and the substances corresponding to the respective statistical values. This database is a collection of information items (i.e., data) stored in a memory, a HDD, or a cloud and organized in such a manner that it can be searched and data can be accumulated. In addition, various information items necessary for controlling the muon tomography apparatus 1 are stored in the memory 13. This memory 13 includes a data recording region 15.

Figure 3:
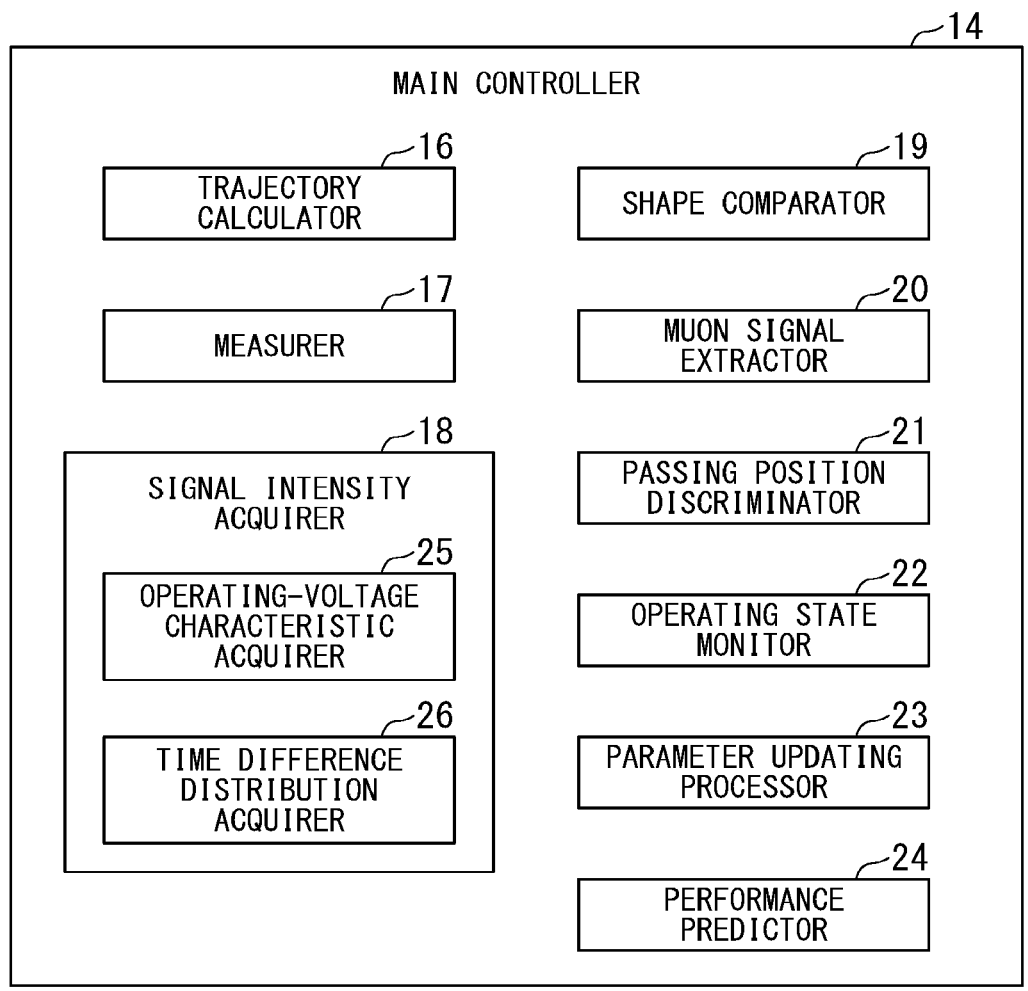
FIG. 3 is a block diagram illustrating a main controller in the first embodiment.

As shown in FIG. 3, the main controller 14 integrally controls the muon tomography apparatus 1. The main controller 14 includes a trajectory calculator 16, a measurer 17, a signal intensity acquirer 18, a shape comparator 19, a muon signal extractor 20, a passing position discriminator 21, an operating state monitor 22, a parameter updating processor 23, and a performance predictor 24. The signal intensity acquirer 18 includes an operating-voltage characteristic acquirer 25 and a time difference distribution acquirer 26, and both are achieved by causing the CPU to execute the programs stored in the memory or the HDD.

Figure 4:
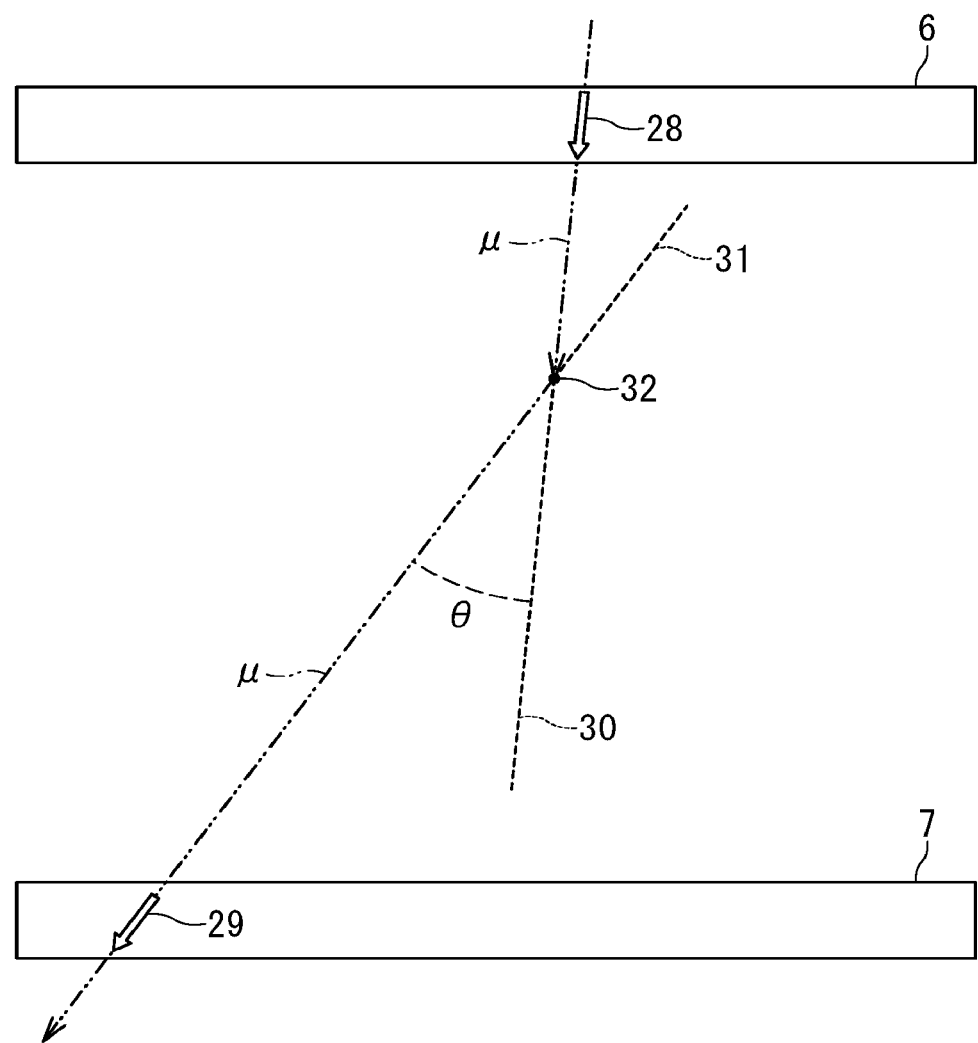
FIG. 4 is a schematic diagram illustrating a scattering angle of the muon.

A description will be given of the measurement mode of the scattering angle $\theta$ with the use of the first muon trajectory detector 6 and the second muon trajectory detector 7 in detail by referring to FIG. 4. Each of the first muon trajectory detector 6 and the second muon trajectory detector 7 is a unit having the same configuration. In the following description, it is assumed that the first muon trajectory detector 6 is an incoming side of the muon $\mu$ and the second muon trajectory detector 7 is an outgoing side of the muon $\mu$. Note that the relationship between the incoming side and the outgoing side may be exchanged, i.e., the second muon trajectory detector 7 may be the incoming side while the first muon trajectory detector 6 is the outgoing side.

The trajectory calculator 16 (FIG. 3) analyzes an incoming muon vector 28 indicative of the passing coordinates and passing angle of the muon $\mu$ at the time of incoming into the first muon trajectory detector 6. The trajectory calculator 16 analyzes an outgoing muon vector 29 indicative of the passing coordinates and passing angle of the muon $\mu$ at the time of outgoing from the second muon trajectory detector 7. The trajectory calculator 16 extracts the trajectory of the muon $\mu$ on the basis of the analyzed passing coordinates and passing angle of the muon $\mu$.

As to the analysis to be executed by the trajectory calculator 16, the trajectory of the muon $\mu$ detected within a certain time (for example, within the range of 1 microsecond or less) by each of the first and second muon trajectory detectors 6 and 7 is assumed to be ascribable to the same muon $\mu$, and the trajectory of the muon $\mu$ at the time of incoming (incoming muon vector 28) and the trajectory at the time of outgoing (outgoing muon vector 29) are treated as one data set.

The trajectory calculator 16 generates, as trajectories, virtual straight lines 30 and 31 extending from the respective first and second muon trajectory detectors 6 and 7 passed by the muon $\mu$ on the basis of the passing coordinates and the passing angle of the muon $\mu$.

For example, the trajectory calculator 16 specifies the position where the virtual straight line 30 obtained by extending the direction of the incoming muon vector 28 and the virtual straight line 31 obtained by extending the direction of the outgoing muon vector 29 intersect. This position indicates the coordinate 32 where the muon scattering has occurred. The angle (i.e., difference between the trajectories) formed by the virtual straight lines 30 and 31 is the angle when the advance direction of the muon $\mu$ changes, and is the scattering angle $\theta$ of the muon $\mu$. The scattering angle $\theta$ is the so-called magnitude of scattering of the muon $\mu$.

The measurer 17 (FIG. 3) analyzes the scattering angle $\theta$ of the muon scattering on the basis of the trajectories of the muon $\mu$. The measurer 17 analyzes the scattering angle $\theta$ of the muon $\mu$ by setting the intersection point of the virtual straight lines 30 and 31 as the coordinate 32 where muon scattering has occurred.

For each coordinate position, the measurer 17 accumulates and stores the results of scattering angles $\theta$ acquired from a plurality of muons $\mu$. The analysis is performed under the assumption that the statistical value of the above-described accumulated results is the scattering angle $\theta$ at the coordinate 32 where scattering of the muon $\mu$ has occurred. For example, the measurer 17 analyzes the statistical value of the scattering angle $\theta$ of the muon scattering generated in the object 3 inside the vehicle 2 as an object on the basis of the trajectories of the muon $\mu$.

In the case where the trajectory calculator 16 extracts respective trajectories of a plurality of muons that have passed through the object 3, when analyzing the scattering angle $\theta$ of each of the muons $\mu$ from the trajectories of the plurality of muons $\mu$, the measurer 17 calculates at least one statistical value of the mean, median, variance, and arbitrary value of the scattering angle $\theta$. The arbitrary value is a value that can be arbitrarily set by the user. Data indicating the statistical value of the scattering angle $\theta$ and the type of the substance corresponding to each statistical value are stored in advance in the database of the memory 13.

The measurer 17 identifies the type of substance being present in the object 3 on the basis of the scattering angle $\theta$. For example, the measurer 17 identifies the type of substance present in object 3. Additionally or alternatively, the measurer 17 generates information indicating the identification result of the substance type. This result may be shown in text or in a predetermined graph. Further, a predetermined warning may be outputted. For example, when the type of substance is a nuclear substance such as uranium or is a dangerous substance such as an explosive, the predetermined warning may be outputted.

In addition, the measurer 17 refers to the database of the memory 13, identifies the preset substance corresponding to the statistical value, and identifies the type of substance existing in the object 3. In this manner, the accuracy at the time of automatically identifying the type of substance is improved.

Conventionally, as a fluoroscopic technique using the penetrating power of charged particles, there is a method called a penetrating method in which density of a substance is evaluated by the transmittance in the substance. In addition, there is a method called a scattering method that evaluates the degree of scattering in a substance. Regardless of which of both methods is used, information inside a very large structure can be acquired by utilizing the high penetrating power of cosmic ray muons $\mu$. In order to acquire this internal information with high accuracy, it is important to measure the trajectories of the muon $\mu$ with high accuracy. However, the measurement target becomes large due to the characteristics of the muon $\mu$, and the number of muons $\mu$ reaching the ground surface is limited. Because of these two reasons and other reasons, detectors having a large size of several meters or more are often applied.

In this case, though a large number of detectors are required, when a plurality of detectors are arranged, the trajectory can be calculated on the basis of the position information of each detector that has detected the passage of the muon $\mu$ among the plurality of detectors. In the case of specifying these passing positions and in the case of acquiring the position information of the detector, it is necessary to achieve both of a large measurement area and acquisition of highly accurate positional information, and thus, the scale of the measurement apparatus becomes very large.

In this context, a drift tube detector 33 (FIG. 5) is known as one of gas detectors. The passing position is specified from the movement time of electrons inside the drift tube detector 33, and this movement time is called the drift time. Use of the drift tube detector 33 enables a resolution of 1 mm or less, which is much smaller than its own size. For example, when the cylindrical drift tube detector 33 having a diameter φ of 50 mm is used, the passing position of the muon μ can be specified with an accuracy of less than 0.5 mm.

Figure 5:
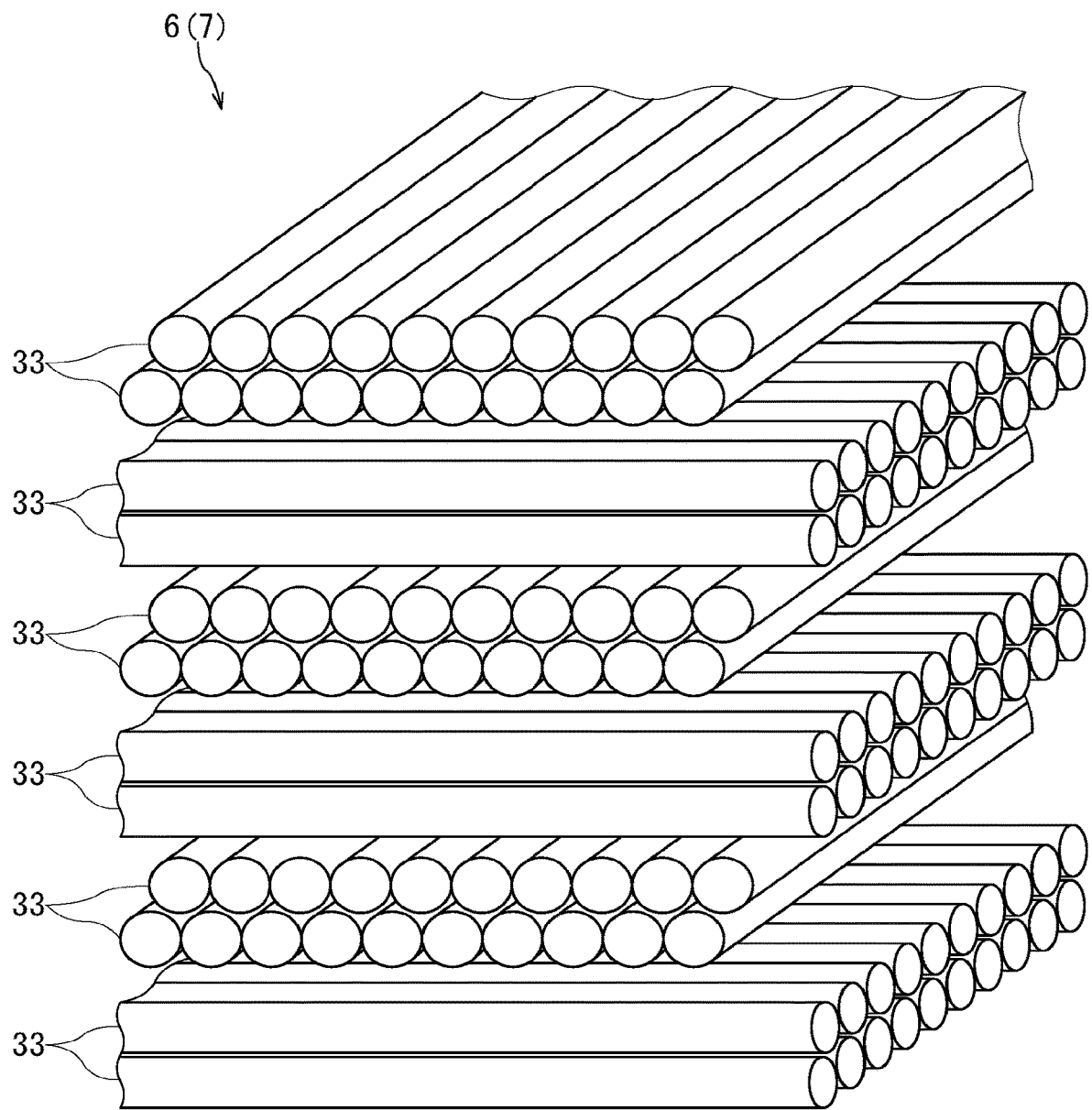
FIG. 5 is a perspective view illustrating arrangement of drift tube detectors.

As shown in FIG. 5, each of the first and second muon trajectory detectors 6 and 7 is composed of a plurality of drift tube detectors 33, each of which has a cylindrical shape and extends in the axial direction. Each drift tube detector 33 is a gas detector in which a gas for detecting the passage of charged particles is enclosed. The respective drift tube detectors 33 are arranged in a plane (i.e., in the X-axis direction or in the Y-axis direction), and these planarly arranged drift tube detectors 33 are further stacked in the vertical direction (i.e., Z-axis direction) so as to form one module.

Although the drift tube multi-wire method is exemplified as the gas detector in the present embodiment, the gas detector may be configured as another aspect as long as it can measure charged particles in particle units (i.e., on a particle-by-particle basis). The gas detector is not limited to a particular detection method or a particular outer shape. Although a method that can specify the X-axis position and the Y-axis position with one gas detector is also applicable, it is preferred that the gas detector has a structure of four or more layers in order to calculate the trajectories of muons μ.

For example, two layers of planarly arranged drift tube detectors 33 extending in the same direction constitute one group of drift tube detectors 33, and six groups are stacked in the Z-axis direction to form a total of 12 layers such that the extending direction of every drift tube detector 33 in each group alternate between the X-axis and the Y-axis (i.e., is orthogonal to that of the adjacent group). In the case of FIG. 5, the drift tube detectors 33 extending in the X-axis direction have six layers, and the drift tube detectors 33 extending in the Y-axis direction have six layers, and these are stacked in the Z-axis direction. In the case of using this structure, when the vehicle 2 to be measured is disposed in the Z-axis direction, the data of the muon μ to be made incoming from the Z-axis direction can be acquired. In this manner, when each group of the planarly arranged drift tube detectors 33 are stacked such that the extending direction of drift tube detectors 33 alternate between the X-axis and the Y-axis, the trajectory of the muon μ passing through each muon trajectory detectors 6 and 7 can be three-dimensionally detected.

Figure 6:
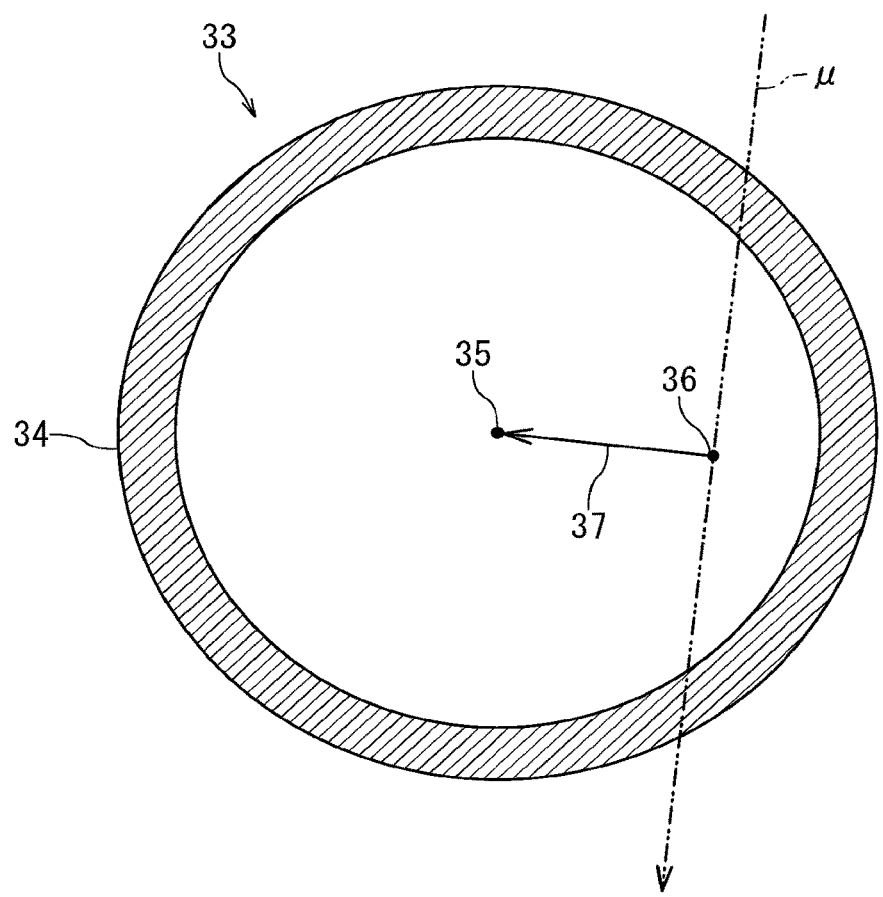
FIG. 6 is a cross-sectional view illustrating a state in which a drift tube detector is sliced.
Figure 7:
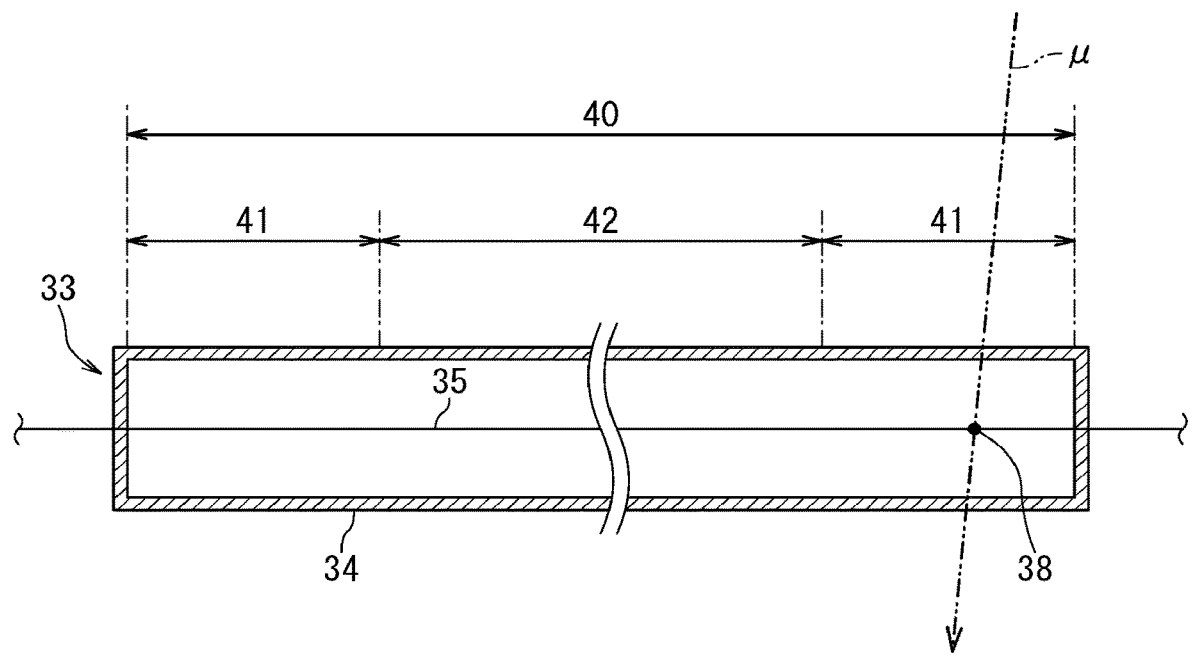
FIG. 7 is a cross-sectional view illustrating the entirety of the drift tube detector in the longitudinal direction.

As shown in FIG. 6 and FIG. 7, each drift tube detectors 33 includes a cylindrical tube 34 and a core wire 35. For example, a core wire 35 made of an anode wire is stretched along the central axis of the aluminum cylindrical tube 34. A high voltage is applied to each drift tube detector 33.

Inside each drift tube detector 33, a gas, which is for ionization and contains a noble gas as a main component, is enclosed. When the muon μ as a charged particle passes through the drift tube detectors 33, the gas is ionized at the passing position 36 (FIG. 6) and separated into an ion and electron(s).

The separated electron move toward the core wire 35 due to the voltage applied to the drift tube detector 33, and the electron avalanche phenomenon occurs in the vicinity of the core wire 35. Consequently, a minute charge of several pC to several hundred pC is generated. At this time, detection signal is outputted from the drift tube detector 33, and the passage of the muon μ is detected. For example, when the ion moves toward the core wire 35, an electric current flow in a pulse shape, this electric current is amplified to a measurable level, and the generation time (i.e., timing or clock time of the generation) of the detection signal is measured.

According to the property that the electric current flow the shortest distance, the main controller 14 can detect at which passage position 38 (FIG. 7) in the axial direction of the drift tube detector 33 the ionization has occurred.

On the basis of the time at which the electron is generated by the ionization of the gas and the time at which the electron reaches the core wire 35, the movement time of the electron to the core wire 35 can be determined. When the movement distance of the electron to the core wire 35 is calculated from this movement time, the passing position 36 of the muon μ inside the drift tube detectors 33 can be measured.

The time length required from the time at which the muon μ passes to the generation of the detection signal is called the drift time and is a value that correlates with the distance (i.e., distance in the radial direction) from the passing position 36 to the core wire 35. In other words, the drift time is a value that correlates with the passing position 36 of the muon μ in the radial direction of the drift tube detector 33. The drift time is the time for the electron to move from the passing position 36 of the muon μ to the core wire 35 (as shown by the arrow 37 in FIG. 6). The drift time is determined by the gas type, shape and operating voltage of the drift tube detector 33. Thus, for example, if the composition of the gas inside the drift tube detector 33 changes or the shape of the drift tube detector 33 changes (deflection or distortion), the measurement performance changes.

As the measurement performance changes, the accuracy of calculating the trajectories of the muons μ to be finally obtained also changes. Thus, in order to measure with a certain measurement performance, it is desirable that the performance of the drift tube detector 33 has not changed. If the performance of the drift tube detector 33 has changed, it is necessary to calibrate or replace the drift tube detector 33 in order to measure with a certain measurement performance.

Thus, the analysis computer 8 of the present embodiment monitors each of the operating states from the data related to the detection signals to be outputted from each of the drift tube detectors 33.

Figure 9:
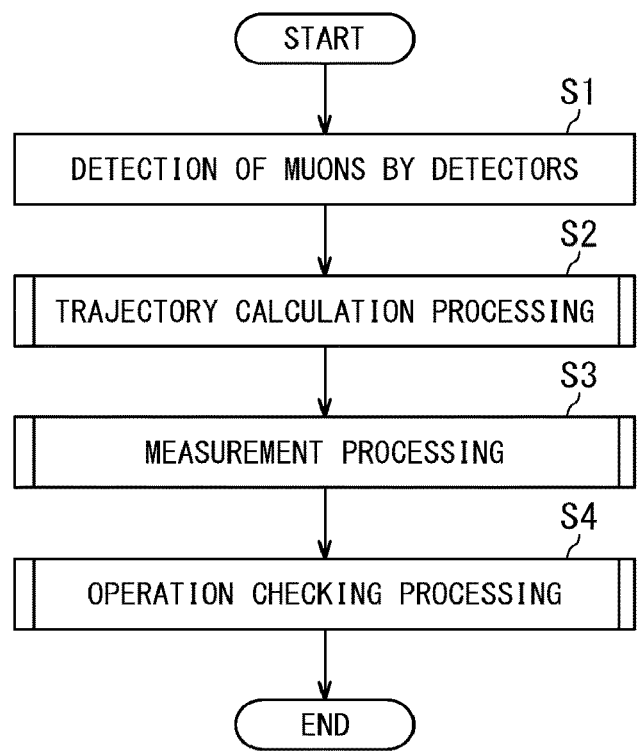
FIG. 9 is a flowchart illustrating control processing to be performed by the muon tomography apparatus.

Next, the control processing to be executed by the analysis computer 8 will be described on the basis of the flowchart of FIG. 9 by referring to the above-described drawings as appropriate.

First, in the next step S1, the drift tube detectors 33 (FIG. 6 and FIG. 7) configured as the gas detectors detect the passage of the muon μ. Here, the detection signals are outputted from the drift tube detectors 33.

In the next step S2, the main controller 14 (FIG. 3) performs trajectory calculation processing. In this trajectory calculation processing, the trajectory calculator 16 (FIG. 3) calculates the trajectory of the muon μ on the basis of the detection signals outputted from the respective drift tube detectors 33 and the parameters associated with the respective drift tube detectors 33.

In the next step S3, the main controller 14 executes measurement processing. In this measurement processing, the measurer 17 (FIG. 3) measures the internal state of the vehicle 2 (FIG. 1) to be measured on the basis of the trajectory of the muon μ. For example, the type of the predetermined object 3 is identified inside the vehicle 2.

In the next step S4, the main controller 14 executes operation checking processing. In this operation checking processing, the signal intensity acquirer 18 (FIG. 3) acquires the signal intensity of the detection signals. In addition, the operating state monitor 22 (FIG. 3) evaluates the operating states of the drift tube detectors 33 on the basis of the signals intensity corresponding to each drift tube detector 33. Further, when the operating state of at least one drift tube detector 33 changes, the parameter updating processor 23 (FIG. 3) updates the parameter associated with this drift tube detector 33. The parameter updating processor 23 stores the individual parameters required for calculating the trajectory of the muon μ in a predetermined recording region of the memory 13, calculates the value to be updated, and updates the value in the recording region.

Afterward, the control processing is completed. Further, this processing is repeated at regular intervals. The analysis computer 8 executes the control method of charged-particle measurement apparatus by repeating this processing. Note that this processing may be executed while the analysis computer 8 is executing other main processing.

Figure 10:
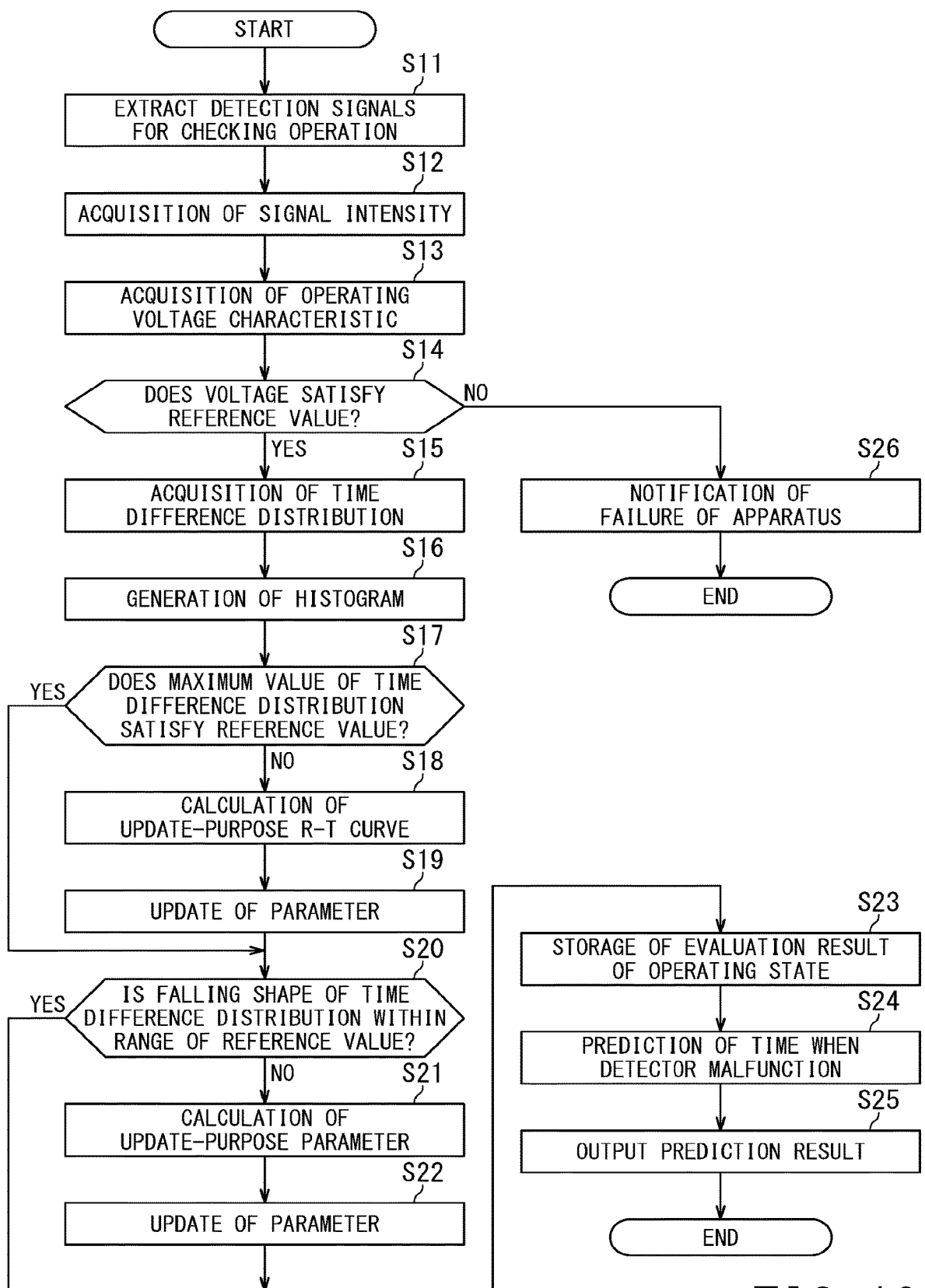
FIG. 10 is a flowchart illustrating operation checking processing.

Next, the operation checking processing will be described on the basis of the flowchart of FIG. 10 by referring to the above-described drawings as appropriate.

In the step S11, the muon signal extractor 20 (FIG. 3) extracts the detection signals for operation checking. For example, among various types of detection signals outputted from the drift tube detectors 33, only the detection signals attributable to the passage of the muon g are extracted. The operating state monitor 22 evaluates the operating states of the drift tube detectors 33 on the basis of the signal intensity of the detection signals outputted due to the passage of the muon μ. In this manner, the detection signals caused by the passage of gamma rays other than the muon μ can be excluded and their influence can be eliminated, so that the evaluation accuracy of the operating states of the drift tube detectors 33 can be improved.

For example, the drift tube detectors 33 are also affected by environmental gamma rays. Thus, the detection signals to be outputted from the drift tube detectors 33 include those caused by muons and those caused by gamma rays. In the case of gamma rays, the electrons generated by the interaction between gamma rays and the substance ionize the gas. However, gamma rays have different energy amounts as compared with muons μ. For example, both are different in amount of energy applied per unit length (dE/dx), and both are different in angular distribution in the flying direction. Thus, more reliable performance evaluation can be realized by excluding the detection signals caused by gamma rays and using the signals of the muons μ that are the actual measurement targets.

The muon signal extractor 20 extracts the detection signals by utilizing the fact that the muon μ is a high-energy charged particle. For example, the muon μ has a high penetrating power and continuously gives energy when passing through a substance, so that the detection signals are generated at the plurality of drift tube detectors 33 almost simultaneously. Electrons attributable to gamma rays cause a stochastic reaction rather than energizing all the substances through which the gamma rays have passed. Thus, in the case of gamma rays, it is rare that the detection signals are generated almost simultaneously at the plurality of drift tube detectors 33. Hence, the muon signal extractor 20 extracts the detection signals under the assumption that the events generated almost simultaneously at the plurality of drift tube detectors 33 are attributable to the muons μ.

The event that has occurred (passage of the muon μ) is accompanied by a set of data obtained from the plurality of drift tube detectors 33. For example, with reference to the event occurrence time (event ID), various information items such as the time at which the detection signal is outputted, the identification information (detector IDs) by which individual drift tube detectors 33 can be identified, and the operating voltage are recorded. These information items are stored in the memory 13 (FIG. 2).

The passing position discriminator 21 (FIG. 3) identifies passing position 38 (FIG. 7) of the muon μ in the axial direction of the drift tube detectors 33. As a part of the total range 40 in the axial direction of each drift tube detector 33, a setting range 41 (FIG. 7) is set in advance, and the operating states of the drift tube detectors 33 is evaluated on the basis of the signal intensity of the detection signal outputted at the timing when the muon μ passes through the preset setting range 41. In this manner, the setting range 41, which is effective for the evaluation of the drift tube detectors 33, can be set in advance for evaluation, and thus, the evaluation accuracy can be improved.

For example, as shown in FIG. 7, of the total range 40 in the axial (or longitudinal) direction of each drift tube detector 33, the predetermined ranges at both ends are set as the setting ranges 41. This setting can be arbitrarily performed by the user in advance. Since the setting ranges 41 at both ends of each drift tube detector 33 are the portions firmly supported by the housing 4 (FIG. 1), each drift tube detector 33 has a normal shape with little deflection or distortion at these setting ranges 41. Contrastively, deflection or distortion often occurs at the non-setting range 42 in the center of each drift tube detector 33, and the drift tube detectors 33 are changed in shape at the non-setting range 42 in some cases. Thus, in the present embodiment, both ends of each drift tube detector 33 are set as the setting ranges 41, and each operating state of each drift tube detector 33 is evaluated on the basis of the muon μ having passed through these setting ranges 41.

Although both ends of the drift tube detectors 33 are set as the setting range 41 in the present embodiment, another aspect may be applied. For example, when the central portion of each drift tube detector 33 is firmly supported by the housing 4 and both ends of each drift tube detector 33 are free ends, the central portion of each drift tube detector 33 may be set as the setting range while both ends are set as the non-setting range.

Although the passing position discriminator 21 identifies the passing position 38 of the muon μ (FIG. 7) in the present embodiment, the configuration of the passing position discriminator 21 may be omitted. For example, the entire range 40 in the axial direction of each drift tube detector 33 may be set as the setting range so that each operating state is evaluated regardless of the detection position of the muon μ.

Returning to FIG. 10, in the next step S12, the signal intensity acquirer 18 (FIG. 3) acquires the signal intensity of the detection signals outputted from the drift tube detectors 33.

In the next step S13, the operating-voltage characteristic acquirer 25 (FIG. 3) acquires the operating-voltage characteristic of the detection signal outputted from each drift tube detector 33. As to this operating voltage characteristic, a reference value is preset at the time of designing the drift tube detector 33.

For example, the operating-voltage characteristic acquirer 25 acquires the event rate of the detection signal for each operating voltage of the drift tube detector 33. As the operating voltage of each drift tube detector 33 is increased, its own gain increases, and its sensitivity to the pulse signal to be measured becomes constant when the gain exceeds a certain level. This constant sensitivity region is referred to as a plateau region. When the drift tube detector 33 is operated in this plateau region, constant sensitivity can be obtained even if the operating voltage changes slightly.

It is known that the sensitivity is greatly reduced at the operating voltage before reaching the plateau region. The change point at which the sensitivity change occurs depends on change in composition of the gas or change in shape of the drift tube detector 33. Thus, the drift tube detector 33 is operated at several points such as the normal operating voltage and the voltage at which sensitivity changes occur, then the sensitivity is evaluated, and then it is checked whether the condition of the reference value is satisfied or whether the voltage at which the sensitivity changes is equivalent to the result of the past measurement.

If the voltage at which this sensitivity changes is within the range of the reference value, it is determined that the operating voltage characteristic is correct. If the voltage at which this sensitivity changes deviates from the range of the reference value, it is considered that abnormality due to some factors has occurred. Although it is referred to as the "change point at which sensitivity change occurs" in the present embodiment, another aspect may be applied. For example, any evaluation point may be used, such as a voltage at which sensitivity change starts and another voltage at which the sensitivity becomes constant. Further, the operating voltage to be acquired by the operating-voltage characteristic acquirer 25 is not limited to a specific value as long as the above-described matters can be determined.

In the next step S14, the operating state monitor 22 determines whether the operating voltage of the detection signal acquired by the operating-voltage characteristic acquirer 25 satisfies the condition of the reference value or not.

If the operating voltage satisfies the condition of the reference value (YES in the step S14), the processing proceeds to the step S15. If the operating voltage does not satisfy the condition of the reference value (NO in the step S14), the processing proceeds to the step S26. In other words, the operating state monitor 22 evaluates the operating state of the drift tube detector 33 on the basis of the operating voltage characteristic corresponding to the drift tube detector 33. In this manner, it can be determined whether the drift tube detector 33 is out of order or not. For example, if the operating voltage does not satisfy the condition of the reference value, it can be considered that the core wire 35 is broken or the gas is leaking.

In the step S26 subsequent to the case of NO in the step S14, the main controller 14 notifies that the drift tube detector 33 is at fault. For example, the main controller 14 causes the output interface 11 (FIG. 2) to display the identification information (detector ID) for identifying the failed drift tube detector 33 and further information indicating that the failure has occurred. Additionally or alternatively, the main controller 14 performs setting of data exclusion processing such that the data of the failed drift tube detector 33 is not used in the subsequent measurement. Afterward, the operation checking processing is completed.

In the step S15 subsequent to the case of YES in the step S14, the time difference distribution acquirer 26 (FIG. 3) acquires the time difference distribution of the detection signals outputted from the respective drift tube detectors 33.

In the next step S16, the shape comparator 19 (FIG. 3) generates histograms corresponding to the respective drift tube detectors 33. In this manner, information on update of the parameters of the drift tube detectors 33 can be acquired. Note that the time difference distribution acquirer 26 may generate the histograms.

Figure 8:
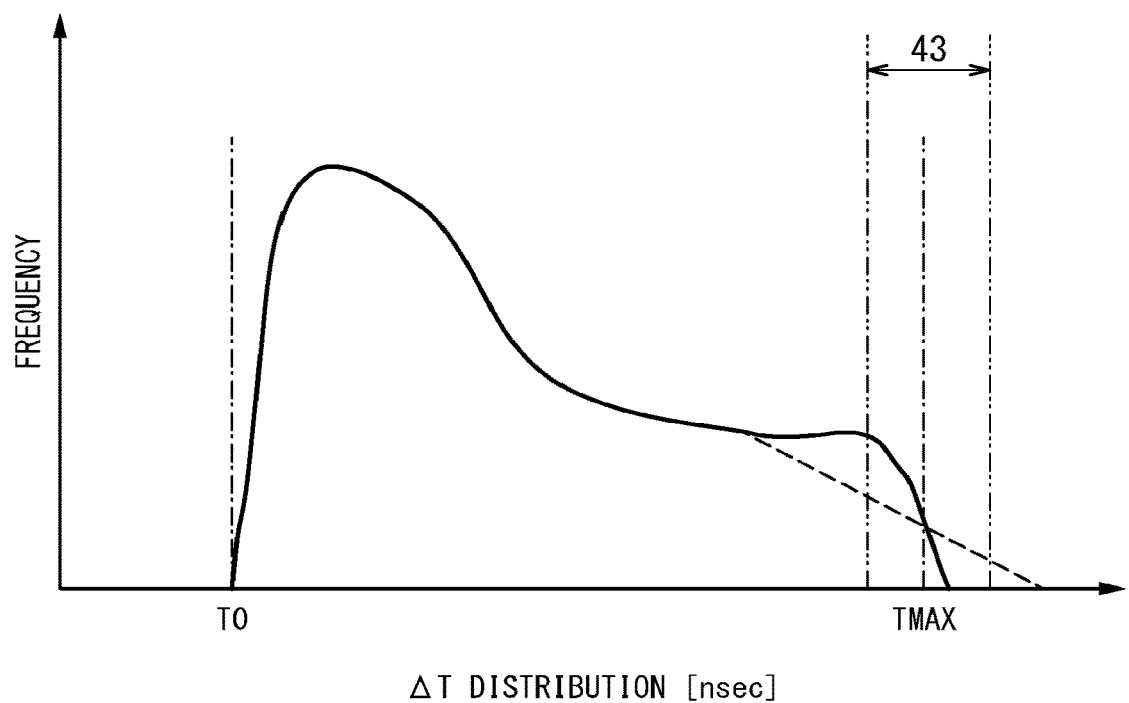
FIG. 8 is a graph illustrating time difference distribution.

For example, as shown in FIG. 8, when the frequency of passage of the muon μ detected by one drift tube detector 33 is accumulated over a predetermined period, one histogram of the time difference distribution is acquired. The histograms are generated for the respective drift tube detectors 33. For example, when 20000 drift tube detectors 33 are included in the apparatus, 20000 histograms are generated.

The time difference distribution acquirer 26 acquires time difference distribution (i.e., distribution of the time at which the detection signal is outputted) by using the occurrence time of the event as the reference (event ID). For example, in the case of the drift tube detector 33 that is operating normally, the time difference distribution is distribution of the difference $\Delta T$ ($\Delta T = DT_n - DT_0$) between the drift time $DT_n$ (n=1 or more) of each drift tube detector 33 and the drift time $DT_0$ of the first drift tube detector 33 that has detected the detection signal in each event.

Since each drift time DT is distributed from 0 second to the maximum drift time TMAX, $\Delta T$ which is the difference between both is similarly distributed from 0 second to the maximum drift time TMAX. Since the correct drift time distribution can be calculated experimentally and analytically, the ideal $\Delta T$ distribution (i.e., reference shape) can be determined if the distribution of the positions where the muons μ pass can be specified. The difference between the ideal $\Delta T$ distribution and the measured $\Delta T$ distribution depends on the time resolution of the muon tomography apparatus 1 and the performance change of each drift tube detector 33.

Specifically, in the drift tube detector 33 (FIG. 7), the core wire 35 may bend or the shape of the cylindrical tube 34 may be distorted, resulting in deviation in relative positional relationship between the inner diameter of the cylindrical tube 34 and the core wire 35. In this case, in addition to that the distortion of the electric field occurs, the drift distance of the electrons (as shown by the arrow 37 in FIG. 6) changes. As a result, the maximum drift time TMAX varies. In addition, when the composition of the gas changes, the characteristics of the drift time change, and thus, the value of TMAX, i.e., the distribution of $\Delta T$ changes. Acquisition of such information enables evaluation of the fact that the core wire 35 is bent, the shape of the cylindrical tube 34 is distorted, or the composition of the gas is changed.

Deflection or distortion in the core wire 35 or the cylindrical tube 34 often varies in degree depending on the axial position of the drift tube detector 33. Thus, when the setting range 41 (FIG. 7) is limited by the passing position discriminator 21 in advance of the evaluation, the evaluation can be performed more accurately.

Returning to FIG. 10, in the next step S17, the operating state monitor 22 evaluates each operating state of each drift tube detector 33 on the basis of each time difference distribution corresponding to each drift tube detector 33. For example, the operating state monitor 22 determines whether the maximum value of the time difference distribution (FIG. 8) satisfies the condition of the reference value or not. For example, the maximum drift time TMAX being used as the reference value is set for the drift tube detector 33. It is determined whether the maximum value of the time difference distribution is larger than this maximum drift time TMAX or whether the excess amount exceeds the predetermined range 43 (FIG. 8).

If the maximum value of the time difference distribution satisfies the condition of the reference value (YES in the step S17), the processing proceeds to the step S20. If the maximum value of the time difference distribution does not satisfy the condition of the reference value (NO in the step S17), the processing proceeds to the step S18.

For example, if the maximum value of the time difference distribution does not satisfy the condition of the reference value, it can be determined that the gas enclosed in the drift tube detector 33 has deteriorated or is leaking. Thus, the parameter of the drift tube detector 33 is updated.

In the next step S18, the parameter updating processor 23 (FIG. 3) calculates an update-purpose R-T curve.

In the next step S19, the parameter updating processor 23 updates the parameter of the drift tube detector 33. The correlation function (R-T curve) between the passing position 36 (FIG. 6) of the muon μ and the drift time is updated.

It is assumed that at least one of the drift tube detectors 33 has a gas leak but outputs the detection signal with the correct signal intensity. In this case, it is considered that the composition of the gas has changed slightly, and the correct passing position 36 can be calculated by updating the R-T curve indicating the correlation function between the passing position 36 of the muon μ and the drift time. If the drift tube detector 33 is distorted, the distortion amount and the position of the core wire 35 are corrected to maintain high calculation accuracy.

If the above-described operating voltage characteristics have changed, in many cases, the amount of gas leakage is large and the composition ratio of the gas is unclear, so the correct R-T curve cannot be estimated. In such a case, correcting the R-T curve is not sufficient for maintaining high calculation accuracy, and thus, it is treated as a failure of the drift tube detectors 33. The R-T curve is an aspect of the parameter, and another parameter may be updated.

In the next step S20, the shape comparator 19 (FIG. 3) compares the shape of each histogram of the time difference distribution (FIG. 8) with the reference shape. In this manner, minute change in performance of the drift tube detectors 33 can be grasped. The operating state monitor 22 evaluates the operating states of the drift tube detectors 33 on the basis of the comparison results of the histograms. For example, the operating state monitor 22 determines whether a shape of the falling portion (a falling shape) of the time difference distribution is within the reference range or not.

If the shape of the falling portion of the time difference distribution is within the reference range (YES in the step S20), the processing proceeds to the step S23. Conversely, if the shape of the falling portion of the time difference distribution is not within the reference range (NO in the step S20), the processing proceeds to the step S21.

If the shape of the falling portion of the time difference distribution is not within the reference range, it can be determined that the shape of the cylindrical tube 34 or the core wire 35 is changed or distorted, for example. In such a case, the parameter of the drift tube detector 33 is updated.

In the step S21, the parameter updating processor 23 (FIG. 3) calculates the update-purpose parameter. This update-purpose parameter is, for example, a parameter for updating a parameter that is used in the trajectory calculation processing.

The update-purpose parameter may be an update-purpose R-T curve. If the update-purpose R-T curve has already been calculated in the above-described step S19, the one indicating a difference from the update-purpose R-T curve may be calculated to acquire a new update-purpose R-T curve.

In the next step S22, the parameter updating processor 23 updates the parameter of the drift tube detector 33.

For example, as shown in FIG. 8, the shape of the falling portion of the time difference distribution indicates the shape of the portion where the line drop in the range 43 closest to the maximum drift time TMAX in the histogram. In an ideal case, this shape of the falling portion drops sharply at the maximum drift time TMAX (as shown by a solid line in FIG. 8). However, as the drift tube detectors 33 deteriorate, this shape of the falling portion becomes gentle (as shown by a broken-line in FIG. 8). In the present embodiment, the reference shape of the histograms is set, and the deterioration of each of the drift tube detectors 33 is evaluated by comparing the shape of each of the actually measured histograms with the reference shape.

At the time of manufacture in the factory, the parameter (R-T curves) of every drift tube detector 33 is the same. After a long period of use, each of the parameters of the drift tube detectors 33 is updated, and the drift tube detectors 33 become different in parameters from each other. The update-purpose parameter in the present embodiment may be an index indicative of difference from the parameter being set immediately before the update.

The information to be obtained from one of the operating-voltage characteristic acquirer 25 and the time difference distribution acquirer 26 can identify only the occurrence of abnormality that is either change in gas or change in shape of the drift tube detector 33. Thus, in the present embodiment, the operating state of the drift tube detector 33 is grasped by performing the evaluation with the use of the information obtained from both of the operating-voltage characteristic acquirer 25 and the time difference distribution acquirer 26, and the countermeasures can be determined on the basis of the evaluation and the operating states. As a result, the drift tube detector 33 provided with the countermeasures can continue to be used. The analysis computer 8 is configured such that the data of the failed drift tube detector 33 is not used in the subsequent measurements.

Returning to FIG. 10, in the next step S23, the main controller 14 stores the evaluation results acquired by the operating state monitor 22 in the data recording region 15 (FIG. 2) of the memory 13. In this manner, data showing the evaluation results accumulated in the past can be used to predict the time when the drift tube detector 33 malfunction in the future.

In the next step S24, on the basis of the past evaluation results, the performance predictor 24 (FIG. 3) predicts the time when the performance of the drift tube detector 33 no longer satisfies the reference performance. For example, the performance predictor 24 predicts whether the drift tube detector 33 will malfunction after a few months, after a few years, or not. The performance predictor 24 can also compare and evaluate the past data and the current data.

In the next step S25, the main controller 14 controls the output interface 11 (FIG. 2) such that the prediction result is displayed for each of the drift tube detectors 33 distinguished by individual detector IDs (identification information). Afterward, the operation checking processing is completed.

In the evaluation of the operating states of the drift tube detectors 33, classification or state determination may be performed by machine learning with the use of each data. For example, determination on the histograms of the time difference distribution may be performed by machine learning.

The muon tomography apparatus 1 may include a computer having artificial intelligence (AI) that performs machine learning. For example, the analysis computer 8 may include a deep learning unit that extracts a specific pattern from a plurality of patterns on the basis of deep learning.

In the analysis using the computer of the present embodiment, an analysis technique based on learning of AI can be used. For example, a learning model generated by machine learning using a neural network, a learning model generated by other machine learning, a deep learning algorithm, or a mathematical algorithm such as regression analysis can be used. In addition, forms of machine learning include forms such as clustering and deep learning.

The system of the present embodiment includes the computer having AI that performs machine learning. For example, the system may be configured by a single computer that includes a neural network or the system may be configured by a plurality of computers including the neural network.

The above-described neural network is a mathematical model that expresses the characteristics of brain functions by computer simulation. For example, artificial neurons (nodes) that form a network through synaptic connections change the synaptic connection strength through learning and show a model that has acquired problem-solving ability. Furthermore, the neural network acquires problem-solving ability by deep learning.

For example, the neural network is provided with intermediate layers composed of multiple layers. Each layer of the intermediate layers is composed of, for example, multiple units. In addition, feature amount in a pattern of change in state of a circuit or system can be automatically extracted by causing the multilayer neural network to learn in advance with the use of learning data (training data). On the user interface, the multilayer neural network can set arbitrary number of intermediate layers, arbitrary number of units, arbitrary learning rate, arbitrary number of times of learning, and arbitrary activation function.

The neural network may use deep reinforcement learning in which a reward function is set for each of various information items to be learned and the information item with the highest value is extracted from the various information items on the basis of the reward function.

For example, a Convolution Neural Network (CNN) that has a proven performance in image recognition is used. In this CNN, the intermediate layer is composed of a convolution layer and a pooling layer. The convolution layer obtains a feature map by applying filtering processing to nearby nodes in the previous layer. The pooling layer further reduces the feature map outputted from the convolution layer so as to generate a new feature map. A slight positional shift in feature amount can be absorbed by acquiring the maximum pixel value in the pixels of a target region of the feature map.

The convolution layer extracts local features of the image, and the pooling layer performs processing of integrating or aggregating the local features. In the processing to be executed by the convolution layer and the pooling layer, the image is reduced in size while maintaining the features of the input image. That is, the CNN can greatly compress (abstract) the amount of information that an image has. Further, the input image can be recognized and the image can be classified by using the abstracted image stored in the neural network.

In machine learning, there are various methods such as an auto encoder, a Long Short-Term Memory (LSTM), a Signed Distance Function (SDF), a Generative Adversarial Network (GAN), and a Recurrent Neural Network (RNN). These methods may be applied to the machine learning of the present embodiment.

Figure 11:
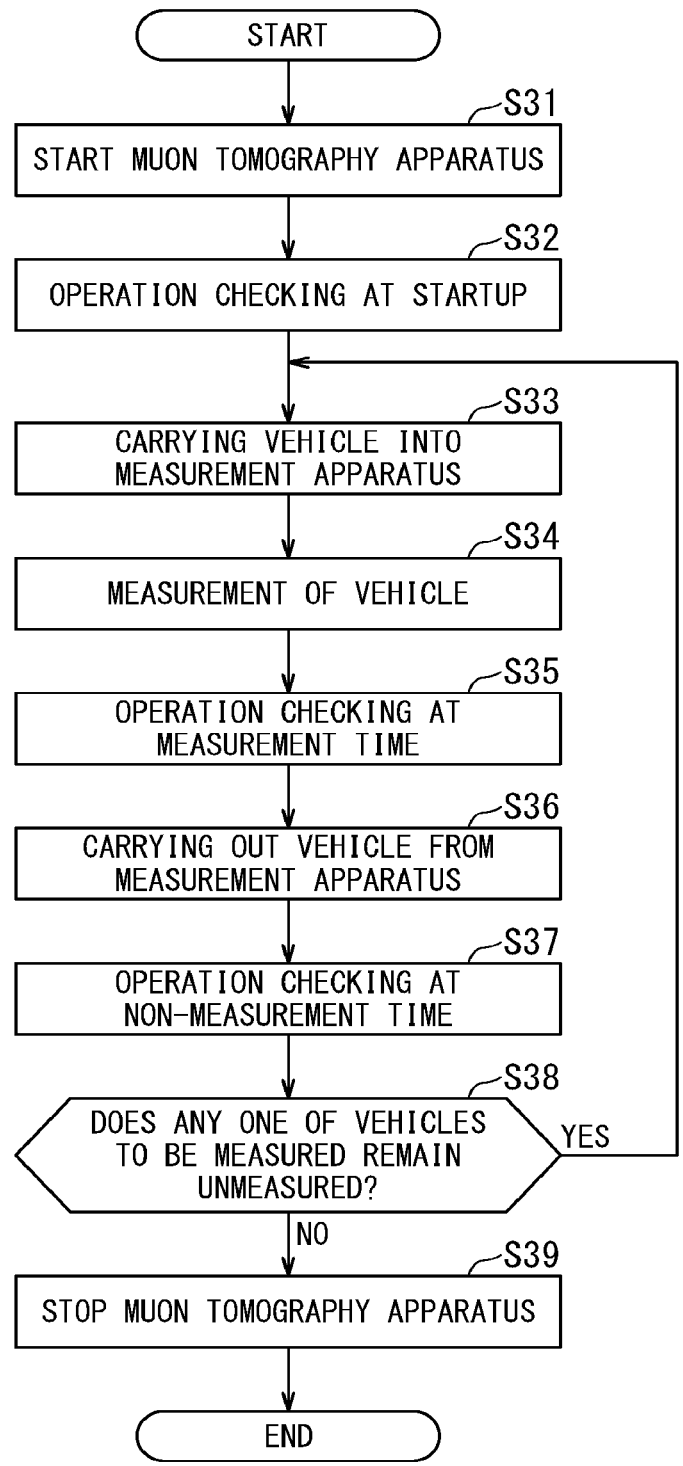
FIG. 11 is a flowchart illustrating an operation method of the muon tomography apparatus.

Next, the operation method of the muon tomography apparatus 1 will be described on the basis of the flowchart of FIG. 11 by referring to the above-described drawings as appropriate.

In the present embodiment, after the muon tomography apparatus 1 is started, the operation of the drift tube detectors 33 is checked by using the data acquired in at least two periods including a period during which the object is present and another period during which the object is not present.

For example, it is assumed that a plurality of vehicles 2 is sequentially measured by using one muon tomography apparatus 1 (FIG. 1). In the case of using cosmic ray muons $\mu$, the number of muons $\mu$ is limited to the components that fall from the universe, and the number of muons $\mu$ determines the measurement time. Thus, if the measurement time is spent only for checking the operation of the drift tube detectors 33, the measurement time of the vehicles 2 may be reduced, and the number of vehicles 2 that can be measured in one day is also reduced. Accordingly, muons $\mu$ are continuously detected in a period during which a plurality of vehicles 2 is sequentially set for measurement and measured. The operation of each drift tube detector 33 is checked by using the data collected a plurality of times during this period. In this manner, the operating states of the drift tube detectors 33 can be periodically monitored without reducing the measurement time of the vehicle 2, and the best condition can be maintained at all times.

First, in the step S31, the user starts the muon tomography apparatus 1.

In the next step S32, the operation of the muon tomography apparatus 1 at startup is checked. Here, the above-described operation checking processing (FIG. 9 and FIG. 10) is executed, and monitoring of the operating states of the drift tube detectors 33 and updating of the parameters are performed.

In the next step S33, one vehicle 2 is carried into the muon tomography apparatus 1.

In the next step S34, muon inspection of the vehicle 2 is performed by using the muon tomography apparatus 1.

In the next step S35, the operation of the muon tomography apparatus 1 at the time of measurement is performed. Here, the above-described operation checking processing (FIG. 9 and FIG. 10) is executed, and monitoring of the operating states of the drift tube detectors 33 and updating of the parameters are performed.

In the next step S36, the vehicle 2 is carried out from the muon tomography apparatus 1.

In the next step S37, the operation of non-measurement time (i.e., operation in the period during which the vehicle 2 is not set in the muon tomography apparatus 1) is measured. Here, the above-described operation checking processing (FIG. 9 and FIG. 10) is executed, and monitoring of the operating states of the drift tube detectors 33 and updating of the parameters are performed.

In the next step S38, the user determines whether at least one of the vehicles 2 to be measured remains unmeasured or not. If at least one of the vehicles 2 to be measured remains unmeasured (YES in the step S38), the processing returns to the above-described step S33. Conversely, if the measurement is completed for all the vehicles 2 to be measured (NO in the step S38), the processing proceeds to step S39.

In the next step S39, the user stops the muon tomography apparatus 1, and then the operation method is terminated.

As described above, the operating state monitor 22 evaluates the operating states of the drift tube detectors 33 on the basis of the signal intensity acquired in both of the measurement period (the measurement timing) during which the vehicle 2 is measured and the non-measurement period (the non-measurement timing) during which the vehicle 2 is not measured. In this manner, the operating states of the drift tube detectors 33 can be continuously grasped. In addition, the muon tomography apparatus 1 can always be maintained in the best condition. Furthermore, the muon tomography apparatus 1 can be operated while checking as to whether an abnormality has occurred is being sequentially performed.

In general, regarding the measurement time length by the muon tomography apparatus 1, if it is under an environment where sufficient amount of muons µ can be measured, constant information can be obtained in about several minutes to several tens of minutes. However, the replacement work of the object takes several minutes in the case of a large vehicle 2 such as a truck. Thus, in the present embodiment, checking of the operating states of the drift tube detectors 33 and updating of the parameters can be performed about once for 10 times of measurement.

The information obtained from one drift tube detector 33 only shows the passing position 36 (FIG. 6) of the muon µ, and cannot identify its trajectory. However, the trajectory can be calculated by causing the trajectory calculator 16 to process the information of the distance and the passing position 36, which are obtained for the passage of the same muon µ from the plurality of drift tube detectors 33. In the present embodiment, the trajectory can be calculated even if the passage time (i.e., clock time of passage) of the muon µ cannot be clearly specified. Further, the passage time of the muon µ can also be measured by another drift tube detector 33 so as to be used for evaluation.

According to the first embodiment, on the basis of the data obtained by the drift tube detectors 33, in addition to that the performance change of the drift tube detector 33 can be excluded in the evaluation, the data of the failed drift tube detector 33 that cannot be used for evaluation can be excluded. This eliminates the need for overhaul of the muon tomography apparatus 1 and enables the muon tomography apparatus 1 to monitor and diagnose the drift tube detectors 33.

Second Embodiment

Next, the second embodiment will be described by referring to FIG. 12 and FIG. 13. The same reference signs are assigned to the same components as the first embodiment in each figure, and duplicate description is omitted.

Figure 12:
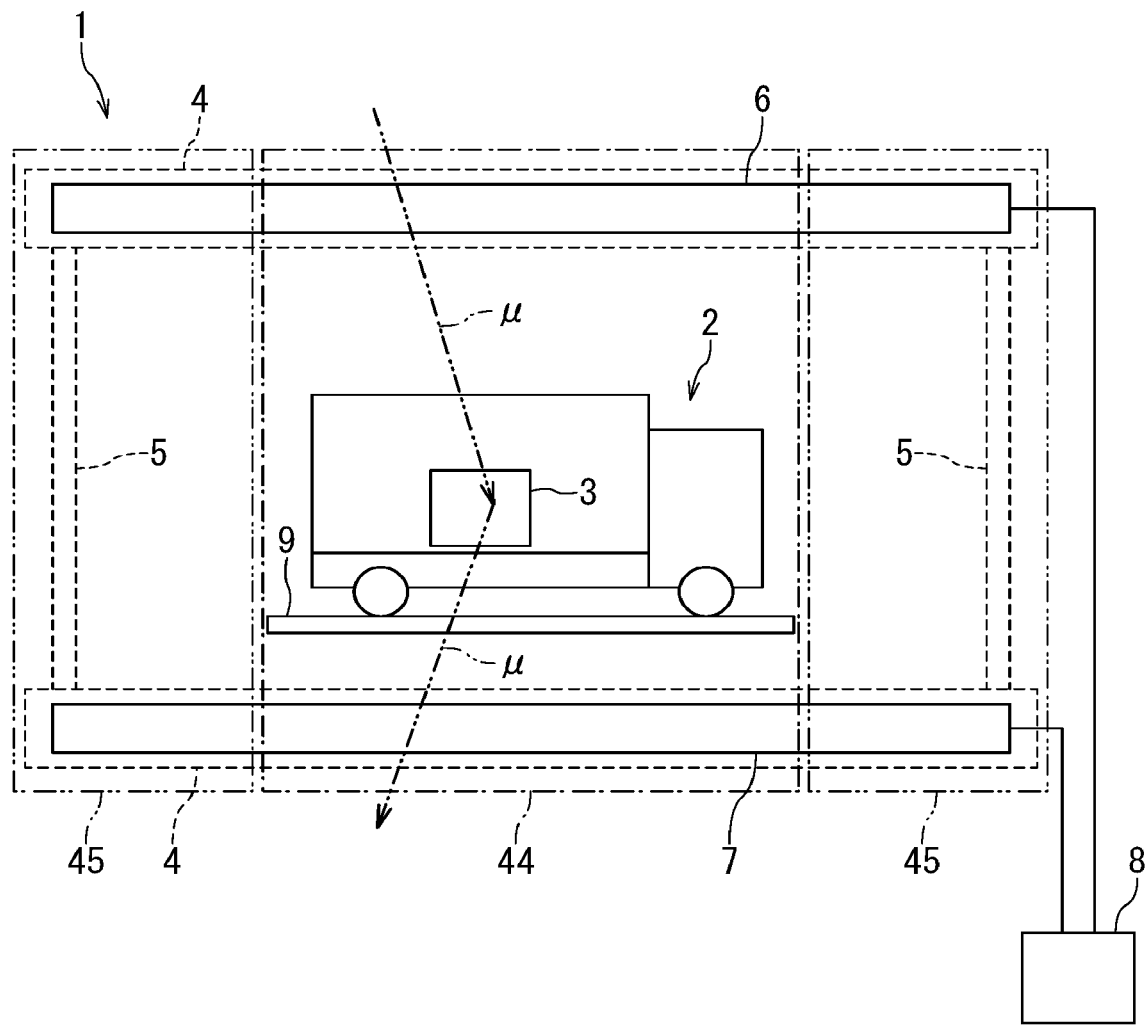
FIG. 12 is a schematic diagram illustrating a muon tomography apparatus according to the second embodiment.

As shown in FIG. 12, in the muon tomography apparatus 1 of the second embodiment, there are objects which are fixed in positional relationship in advance, in addition to the fixed components such as the housing 4 and the stanchion 5. In checking of the operation of the drift tube detectors 33 (FIG. 5), these objects are imaged to check whether the drift tube detectors 33 work normally or not.

Among the muon tomography techniques, in the case of using the scattering method in which imaging is performed on the basis of the degree of scattering in the object, variation in the scattering angles θ of the muons µ that have passed through the object is used. In this case, if the detection performance of muons µ changes, the scattering angle θ varies, and the measurement result may change. For this reason, measurement is performed by using the muons µ on a component that has a known structure and exists outside the region for setting the object, such as the housing (frame) 4, the stanchion 5, and a predetermined test piece (not shown).

For example, the entire region that can be measured by the drift tube detectors 33 is divided into a measurement target region 44 in which the vehicle 2 (i.e., object) is set and a non-measurement region 45 in which the vehicle 2 is not set. The measurement target region 44 and the non-measurement region 45 can be arbitrarily set by the user in advance in consideration of the size of the vehicle 2. In the second embodiment, the regions in front of and behind the vehicle 2 are set as the non-measurement region 45. In the case of imaging the measurement target region 44, the image of the vehicle 2 is included in addition to the respective images of the housing 4 and the stanchion 5. In the case of imaging the non-measurement region 45, the respective images of the housing 4 and the stanchion 5 are included but the image of the vehicle 2 is not included.

Figure 13:
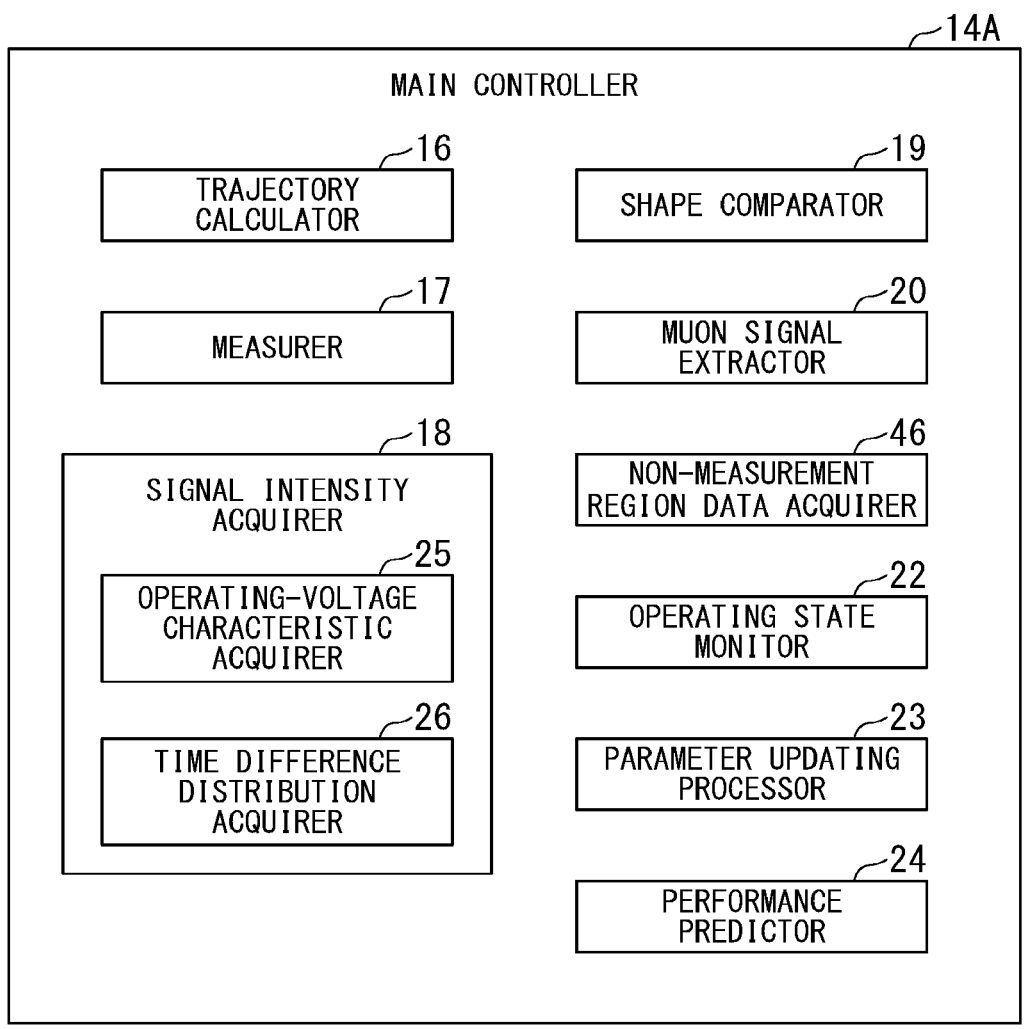
FIG. 13 is a block diagram illustrating the main controller in the second embodiment.

As shown in FIG. 13, the main controller 14A of the second embodiment includes a non-measurement region data acquirer 46 instead of the above-described passing position discriminator 21 (FIG. 3). This non-measurement region data acquirer 46 acquires the detection signals corresponding to the non-measurement region 45. Further, the operating state monitor 22 evaluates the operating states of the drift tube detectors 33 on the basis of the signal intensity of the acquired detection signals corresponding to the non-measurement region 45. This operating state also includes information such as mis-alignment of the drift tube detector 33 (i.e., displacement of the drift tube detector 33 from the normal position).

For example, the non-measurement region data acquirer 46 extracts data of the muon µ that has passed through the non-measurement region 45 at the time of operation checking. The operating state monitor 22 monitors the scattering angle distribution and transmittance distribution in the non-measurement region 45, and compares them with the reference value. If the condition of the reference value is satisfied, it is determined that the drift tube detector 33 is normal and maintains satisfactory performance. If the condition of the reference value is not satisfied, it is determined that the drift tube detector 33 has abnormality.

If there is abnormality, there is a possibility that the positional relationship between the first and second muon trajectory detectors 6 and 7 disposed on the upper and lower sides has shifted due to the distortion of the housing 4 or vibration such as an earthquake. In such a case, the coordinate system of the entire structure of the muon tomography apparatus 1 is updated as countermeasures for the shift in positional relationship.

In addition, the time-dependent variation of the muon tomography apparatus 1 can be obtained by recording the temporal variation of the evaluation result. Except for momentary equipment deterioration such as damage caused by earthquakes, other deterioration due to, for example, gas leaks and distortion of the drift tube detectors 33 often change slowly over time. Thus, the progress of deterioration can be predicted by measuring the time-dependent variation. In particular, the time at which the drift tube detectors 33 go beyond their operating conditions and become defective may be predicted by calculation. Similarly, the time at which the ratio of defective drift tube detectors 33 exceeds the allowable number may be predicted by calculation, and those prediction results can be used for long-term monitoring or maintenance. Any method such as machine learning can be applied to the above-described prediction, and not only simple aging deterioration but also the influence of seasonal variation such as temperature change can be reflected in the prediction.

According to the second embodiment, the drift tube detectors 33 can be evaluated by the trajectory of the muons μ which are not affected by the vehicle 2, and thus, the evaluation accuracy can be improved. For example, it enables monitoring of items including the distortion of the housing 4 that supports the drift tube detectors 33, and it also enables the prediction of deterioration. This eliminates the need for detailed overhaul and enables long-term monitoring.

Even in the case of a component that exist in the measurement target region 44, such a component can also be used as an evaluation reference as long as the structure of the component is known, as exemplified by the base 9.

Although the charged-particle measurement apparatus and its control method has been described on the basis of the first to second embodiments, the configuration applied in any one of the embodiments may be applied to other embodiments or the configurations in the respective embodiments may be applied in combination.

In the above-described embodiments, the determination between a predetermined value (for example, the voltage, the maximum value of the time difference distribution, and the shape of the falling portion) and a determination value (for example, the reference value, the reference shape, and the reference range) may be (i) determination as to whether the predetermined value is not smaller than the determination value or not, (ii) determination as to whether the predetermined value is larger than the determination value, (iii) determination as to whether the predetermined value is not larger than the determination value or not, or (iv) determination as to whether the predetermined value is smaller than the determination value or not.

Although a mode in which each step is executed in series is illustrated in the flowcharts of the above-described embodiments, the execution order of the respective steps is not necessarily fixed and the execution order of part of the steps may be changed. Additionally, some steps may be executed in parallel with another step.

The analysis computer 8 in the above-described embodiments includes a storage device such as a Read Only Memory (ROM) and a Random Access Memory (RAM), an external storage device such as a Hard Disk Drive (HDD) and a Solid State Drive (SSD), a display device such as a display panel, an input device such as a mouse and a keyboard, a communication interface, and a control device which has a highly integrated processor such as a Field Programmable Gate Array (FPGA), a Graphics Processing Unit (GPU), a Central Processing Unit (CPU), and a special-purpose chip. The analysis computer 8 can be achieved by hardware configuration with the use of the normal computer.

Note that each program executed in the analysis computer 8 of the above-described embodiments is provided by being incorporated in a memory such as a ROM in advance. Additionally or alternatively, each program may be provided by being stored as a file of installable or executable format in a non-transitory computer-readable storage medium such as a CD-ROM, a CD-R, a memory card, a DVD, and a flexible disk (FD).

In addition, each program executed in the analysis computer 8 may be stored on a computer connected to a network such as the Internet and be provided by being downloaded via a network. Further, the analysis computer 8 can also be configured by interconnecting and combining separate modules, which independently exhibit respective functions of the components, via a network or a dedicated line.

Although a pair of the first and second muon trajectory detectors 6 and 7 is positioned so as to face each other with the vehicle 2 vertically interposed therebetween in the above-described embodiments, another aspect may be applied. For example, two pairs of the first and second muon trajectory detectors 6 and 7 may be provided such that one pair of the first and second muon trajectory detectors 6 and 7 face each other with the vehicle 2 vertically interposed therebetween and the other pair of the first and second muon trajectory detectors 6 and 7 face each other with the vehicle 2 horizontally interposed therebetween. Further, the muon trajectory detectors do not have to be a set of two detectors, and an odd number of muon trajectory detectors may be provided. For example, three or more muon trajectory detectors may be provided.

According to at least one embodiment described above, the operating state monitor configured to evaluate the operating states of the gas detectors on the basis of the signal intensity corresponding to each gas detector is provided, so the type or degree of deterioration of the gas detectors can be grasped and the constant measurement accuracy can be maintained for the long period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A charged-particle measurement apparatus comprising:
a plurality of gas detectors in each of which gas for detecting passage of a charged particle is enclosed;
a trajectory calculator configured to calculate a trajectory of the charged particle based on detection signals outputted from the plurality of gas detectors and each of parameters associated with the plurality of gas detectors;
a measurer configured to measure an object based on the trajectory of the charged particle, the object being a measurement target;
a signal intensity acquirer configured to acquire signal intensity of the detection signals;
an operating state monitor configured to evaluate each of operating states of the plurality of gas detectors based on the signal intensity corresponding to each of the plurality of gas detectors; and
a parameter updating processor configured to update at least one parameter when at least one of the operating states of the plurality of gas detectors associated with this parameter changes, wherein
the signal intensity acquirer includes a time difference distribution acquirer configured to acquire time difference distribution of at least one detection signal; and
the operating state monitor is configured to evaluate at least one operating state based on the time difference distribution corresponding to at least one gas detector.

2. The charged-particle measurement apparatus according to claim 1, wherein:
the signal intensity acquirer includes an operating-voltage characteristic acquirer configured to acquire an operating voltage characteristic of at least one detection signal; and
the operating state monitor is configured to evaluate at least one operating state based on the operating voltage characteristic corresponding to at least one gas detector.

3. The charged-particle measurement apparatus according to claim 1, further comprising a shape comparator configured to generate a histogram of the time difference distribution and compare a shape of the histogram with a reference shape,
wherein the operating state monitor is configured to evaluate at least one operating state based on a comparison result of the histogram.

4. The charged-particle measurement apparatus according to claim 1, further comprising a muon signal extractor, wherein:
the charged particle includes at least a muon;
the muon signal extractor is configured to extract only one or plurality of detection signals attributable to passage of the muon from among the detection signals outputted from the gas detectors; and
the operating state monitor is configured to evaluate at least one operating state based on the signal intensity of the one or plurality of detection signals attributable to passage of the muon.

5. The charged-particle measurement apparatus according to claim 1, wherein:
the charged-particle measurement apparatus is configured to sequentially measure a plurality of objects; and
the operating state monitor is configured to evaluate at least one operating state based on the signal intensity acquired in both of a period during which one of the plurality of objects is measured and another period during which none of the plurality of objects are measured.

6. A charged-particle measurement apparatus, comprising
a plurality of gas detectors in each of which gas for detecting passage of a charged particle is enclosed;
a trajectory calculator configured to calculate a trajectory of the charged particle based on detection signals outputted from the plurality of gas detectors and each of parameters associated with the plurality of gas detectors;
a measurer configured to measure an object based on the trajectory of the charged particle, the object being a measurement target;
a signal intensity acquirer configured to acquire signal intensity of the detection signals;
an operating state monitor configured to evaluate each of operating states of the plurality of gas detectors based on the signal intensity corresponding to each of the plurality of gas detectors;
a parameter updating processor configured to update at least one parameter when at least one of the operating states of the plurality of gas detectors associated with this parameter changes; and
a non-measurement region data acquirer configured to acquire at least one detection signal corresponding to a non-measurement region among regions that can be measured by the plurality of gas detectors, the non-measurement region being a region where the object is not set,
wherein the operating state monitor is configured to evaluate at least one operating state based on the signal intensity of the at least one detection signal corresponding to the non-measurement region.

7. A charged-particle measurement apparatus, comprising
a plurality of gas detectors in each of which gas for detecting passage of a charged particle is enclosed;
a trajectory calculator configured to calculate a trajectory of the charged particle based on detection signals outputted from the plurality of gas detectors and each of parameters associated with the plurality of gas detectors;
a measurer configured to measure an object based on the trajectory of the charged particle, the object being a measurement target;
a signal intensity acquirer configured to acquire signal intensity of the detection signals;
an operating state monitor configured to evaluate each of operating states of the plurality of gas detectors based on the signal intensity corresponding to each of the plurality of gas detectors;
a parameter updating processor configured to update at least one parameter when at least one of the operating states of the plurality of gas detectors associated with this parameter changes; and
a passing position discriminator configured to identify a passing position of the charged particle in at least one of the plurality of gas detectors,
wherein the operating state monitor is configured to evaluate at least one operating state based on the signal intensity of at least one detection signal that is outputted at a time when the charged particle passes a preset setting region in a total range of the gas detector.

* * * * *